US008216076B2

(12) United States Patent  (10) Patent No.: US 8,216,076 B2
Andersson  (45) Date of Patent: Jul. 10, 2012

(54) METHOD FOR COATING WASHERS FOR LOCKING AND COATED WASHER FOR LOCKING

(75) Inventor: Mattias Andersson, Ostersund (SE)

(73) Assignee: Nord-Lock AB (SE)

( * ) Notice: Subject to any disclaimer, the term of this patent is extended or adjusted under 35 U.S.C. 154(b) by 487 days.

(21) Appl. No.: 12/308,261

(22) PCT Filed: Jun. 5, 2007

(86) PCT No.: PCT/SE2007/050400
§ 371 (c)(1),
(2), (4) Date: Dec. 8, 2008

(87) PCT Pub. No.: WO2007/142599
PCT Pub. Date: Dec. 13, 2007

(65) Prior Publication Data
US 2010/0239389 A1    Sep. 23, 2010

(30) Foreign Application Priority Data
Jun. 8, 2006   (SE) ..................... 0601268

(51) Int. Cl.
*B21D 53/20*   (2006.01)
(52) U.S. Cl. ........................................... 470/42
(58) Field of Classification Search ............ 470/41, 470/42
See application file for complete search history.

(56) References Cited

U.S. PATENT DOCUMENTS

| 2,270,813 | A | * | 1/1942 | Olson ........................ 470/42 |
| 2,572,219 | A |   | 10/1951 | Valentine |
| 5,393,567 | A | * | 2/1995 | Wekenmann et al. ...... 427/372.2 |
| 6,435,791 | B1 | * | 8/2002 | Bydalek ........................ 411/428 |
| 6,599,071 | B1 | * | 7/2003 | McCauley et al. ............ 411/378 |
| 2004/0131443 | A1 | * | 7/2004 | Terry ............................ 411/161 |
| 2004/0213646 | A1 |   | 10/2004 | Jakuszeski et al. |

FOREIGN PATENT DOCUMENTS
EP  0353620 A1  2/1990
WO  WO-99/58274 A1  11/1999

OTHER PUBLICATIONS

Observations filed under Art. 115 EPC for European Application No. 0774856.0 (corresponding to U.S. Appl. No. 12/308,261), dated Oct. 19, 2010.
Observations filed under Art. 115 EPC for European Application No. 0774856.0 (corresponding to U.S. Appl. No. 12/308,261), dated Dec. 29, 2010.

(Continued)

*Primary Examiner* — Teresa M Ekiert
(74) *Attorney, Agent, or Firm* — Lerner, David, Littenberg, Krumholz & Mentlik, LLP

(57) ABSTRACT

Methods for manufacturing a hardened steel locking washer are disclosed, the washer having a pattern of teeth on one side and a pattern of cams on the other side, the method comprising the steps of providing the washer with an anti-corrosion coating by providing a low-alloy steel washer, hardening the low-alloy steel washing having a carbon content greater than 0.25% by weight, heating to an austenitizing temperature and subsequent quenching, and applying a basic coating comprising zinc flakes non-electrolytically onto the hardened low-alloy steel washer.

22 Claims, 2 Drawing Sheets

OTHER PUBLICATIONS

Article "Tightening of Screws and Anti-Unscrewing Prevention" in Subfornitura News, Apr. 2006, pp. 16-19 (with English translation).

Handout of presentation by Mr. Robin Miloc of Dorken MKS Systems, Oct. 5, 2005, pp. 1-13 (with English translation).

ISO 10683 (First edition Jul. 15, 2000), "Fasteners—Nonelectrolytically applied zinc flake coatings", pp. i-iv, 1-9.

"Domex Hardenable Steel—Boron Steel", SSAB Tunnplat, Sep. 3, 2001, pp. 1-4.

Fiat Auto Normazione "Aluminium—and Zinc—Lamellar Base Anti-Corrosion Coating for Ferrous Material Parts", May 8, 2006, pp. 1-14 (with English translation).

W. Bergmann, "Werkstofftechnik", Teil 2: Grundlagen, Hanser Verlag, 3rd edition, 2002, pp. 248-261.

German Standards, Cold Rolled Steel Strips for Springs, DIN 17222, pp. 1-11, Aug. 1979.

Siemens Standards, SN 70093, pp. 1-4, Aug. 1993.

Fasteners, DIN 267, part 26, pp. 1-10, Oct. 1987.

* cited by examiner

METHOD FOR COATING WASHERS FOR LOCKING AND COATED WASHER FOR LOCKING

FIELD OF THE INVENTION

The present invention relates to a method for coating washers for locking.

The present invention also relates to a coated washer.

BACKGROUND OF THE INVENTION

Washers for locking, e.g., for bolt securing purposes, having a plate-like shape and on preferably one side a pattern of radially extending teeth and on the other side a pattern of preferably radially extending cams and comprising a central hole for a bolt, a screw or the like fastening element, are previously known. A pair of washers are intended to be applied together, the cam patterns facing each other and tooth patterns being intended to engage a bolt head, a nut or the like and a support or the like, respectively.

In order to obtain an efficient engagement and to resist the considerable force applied to the fastening arrangement the washers are made of a hardenable steel and hardened.

Furthermore, in order to, among other things, resist corrosion, the washers are provided with a coating of zinc, which is applied electrolytically.

A serious problem related to this prior art technique is that during the electrolytic application of the zinc coating, hydrogen is developed, the hydrogen on an atomic scale being solved in the washer steel and causing so-called hydrogen embrittleness, the embrittlement being due to the fact that the hydrogen atoms solved locks dislocations in the steel and, thus, reduces the steel ductility.

To substantially reduce or totally eliminate the hydrogen embrittleness, the washers, which have been hardened and, normally, slightly tempered, are heat treated at about 200° C. for about 48 hours to drive the solved hydrogen out of the steel. This is of course an expensive and time consuming operation which, however, is necessary. Further, said heat treatment tends to add tempering to the hardened steel so that the intended hardness will not be maintained but considerably decreased.

Furthermore, today there is a need for harder washers to be combined with harder bolts and pin bolts for gripping by the washer pattern of teeth. However, such harder washers are obtained by increasing the carbon content to the steel which makes the washers even more sensitive to hydrogen embrittlement and additional tempering during said heat treatment.

One object of the present invention is to provide a method and a washer which offers a solution to the problems described above.

SUMMARY OF THE INVENTION

In accordance with the present invention, this and other objects have now been realized by the invention of a method for manufacturing a hardened steel locking washer, the washer having a pattern of teeth on one side and a pattern of cams on the other side, the method comprising the step of providing the washer with an anti-corrosion coating by providing a low-alloy steel washer, hardening the low-alloy steel washer having a carbon content greater than 0.25% by weight, heating to an austenitizing temperature and subsequent quenching, and applying a basic coating comprising zinc flakes non-electrolytically onto the hardened low-alloy steel washer. Preferably, the carbon content of the low-alloy steel washer is greater than 0.3% by weight.

In accordance with one embodiment of the method of the present invention, the method includes tempering the hardened low-alloy steel washer to a predetermined degree. Preferably, the predetermined degree of tempering decreases the steel hardness by about 5 to 15%. More preferably, the predetermined degree of tempering decreases the steel hardness by less than about 10%.

In accordance with another embodiment of the method of the present invention, the method includes applying a basic coating of DELTA PROTEKT™ KL 100 onto the hardened low-alloy steel washer. In a preferred embodiment, the method includes primary curing of the applied basic coating at about 190 to 230° C. washer temperature for a period of time of less than 60 minutes. Preferably, the period of time is less than 20 minutes. Most preferably, the period of time about 15 minutes.

In a preferred embodiment, the method includes pre-heating for a period of time of about 5 to 10 minutes at a temperature of about 60 to 120° C. prior to the primary curing step. In a preferred embodiment, the period of time is about 7 minutes and the temperature is about 80° C.

In accordance with another embodiment of the method of the present invention, the method includes applying a post sealing top coat non-electrolytically onto the applied basic coating. Preferably, the method includes applying a top coat of DELTA PROTEKT™. Preferably, the top coat comprises DELTA PROTEKT™ VH 300. More preferably, the top coat comprises DELTA PROTEKT™ VH 302 GZ. Even more preferably, the top coat comprises DELTA PROTEKT™ VH 301 GZ.

In accordance with another embodiment of the method of the present invention, the method includes primary curing of the top coat at a temperature of about 190 to 210° C. washer temperature. In a preferred embodiment, the primary curing step is carried out for less than 20 minutes. In a more preferred embodiment, the primary curing step is carried out for about 10 minutes. Preferably, the method includes pre-heating for about 10 minutes at a temperature below 200° C. prior to the top coat primary curing step.

In accordance with another embodiment of the method of the present invention, the coated washer has a hardness over 500 HV. Preferably, the coated washer has a hardness of about 5500 to 560 HV.

In accordance with another embodiment of the method of the present invention, the washer steel comprises 0.25 to 0.30% carbon, 0.20 to 0.35% silicon, 1.00 to 1.30% manganese, 0.030% phosphorus, 0.010% sulphur, 0.20 to 0.60% chromium and 0.0015 to 0.0050% boron, with the balance comprising iron and normal impurities.

In accordance with another embodiment of the method of the present invention, the washer steel comprises 0.3 to 0.36% carbon, up to 0.4% silicon, 1.2 to 1.5% manganese, up to 0.035% phosphorus, up to 0.040% sulphur, 0.3 to 0.6% chromium, 0.0008 to 0.005% boron, with the balance comprising iron and normal impurities.

In accordance with the present invention, a hardened steel locking washer has also been invented comprising a pattern of teeth on one side and a pattern of cams on the other side, the washer being provided with an anti-corrosion coating, the washer comprising a low-alloy steel hardened by heating to an austinitizing temperature and subsequent quenching and having a carbon content of at least 0.25% by weight and a basic coating comprising zinc flakes applied non-electrolytically to the washer. In a preferred embodiment, the carbon content is at least 0.30% by weight. Preferably, the washer is tempered to a predetermined extent. In a preferred embodiment, the predetermined extent of tempering provides a steel hardness decreased by about 5 to 15%. Preferably, the predetermined extent of tempering provides a steel hardness decreased by less than about 10%.

In a preferred embodiment, the primary coating comprises DELTA PROTEKT™ KL 100. Preferably, the primary coating is cured in a primary curing step at a washer temperature of about 190 to 230° C. and a curing time shorter than about 60 minutes. In a preferred embodiment, the washer temperature is about 186 to 200° C., and the curing time is shorter than about 15 minutes. Preferably, the top coat is applied non-electrolytically on the primary coating.

In accordance with a preferred embodiment, the top coat comprises DELTA PROTEKT™. Preferably, the top coat comprises DELTA PROTEKT™ VH 300. More preferably, the top coat comprises DELTA PROTEKT™ VH 302 GZ. More preferably, the top coat comprises DELTA PROTEKT™ VH 301 GZ.

In accordance with another embodiment of the washer of the present invention, the coated washer has a steel hardness over 500 HV. Preferably, the coated washer has a steel hardness from 500 to 560HV.

In accordance with another embodiment of the washer of the present invention, the washer steel comprises 0.25 to 0.30% carbon, 0.20 to 0.35% silicon, 1.00 to 1.30% manganese, 0.030% phosphorus, 0.010% sulphur, 0.20 to 0.60% chromium and 0.0015 to 0.0050% boron, with the balance comprising iron and impurities.

In accordance with another embodiment of the washer of the present invention, the washer steel comprises 0.3 to 0.36% carbon, up to 0.4% silicon, 1.2 to 1.5% manganese, up to 0.035% phosphorus, up to 0.040% sulphur, 0.3 to 0.6% chromium, 0.0008-0.005% boron, with the balance comprising iron and normal impurities.

BRIEF DESCRIPTION OF THE DRAWINGS

A better understanding of the present invention will be had upon reference to the following detailed description when read in conjunction with the accompanying drawings, wherein like reference characters refer to like parts throughtout the several views, and in which.

DETAILED DESCRIPTION

Figure 1:
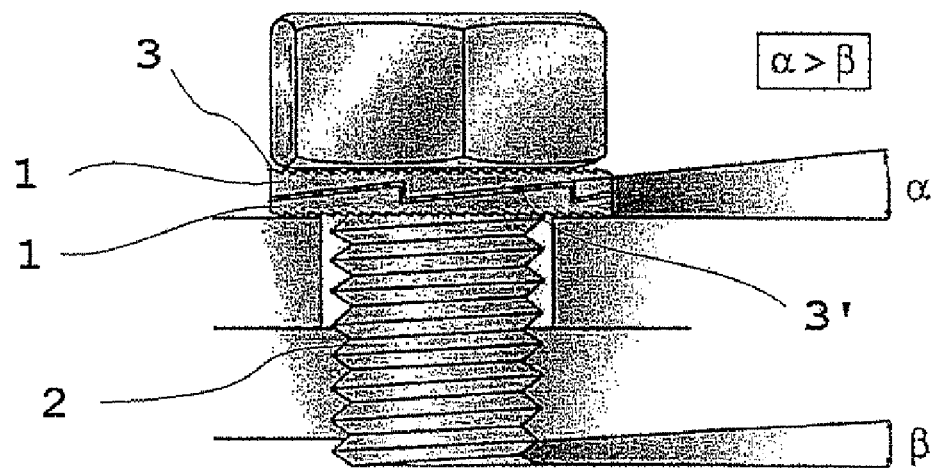
FIG. 1 is a side, elevational, schematic view of a prior art bolt securing system employing a pair of washers.

In FIG. 1, 1 designates locking washers of the kind intended to be manufactured by the method according to the invention and to be arranged according to the invention.

The washers are for locking purposes, eg for securing a bolt 2, each washer having a plate-like shape and on one side a pattern 3 of teeth and on the other side a pattern 3' of cams and comprises a central hole, not shown, for a fastening element 2, such as a bolt, a screw or the corresponding, the washers being intended to be applied in a pair, the cam pattern sides facing each other, and provide a self-locking action when the pitch α of the cams exceeds the pitch β of the threads of the fastening element as shown in the example of FIG. 1.

Figure 2:
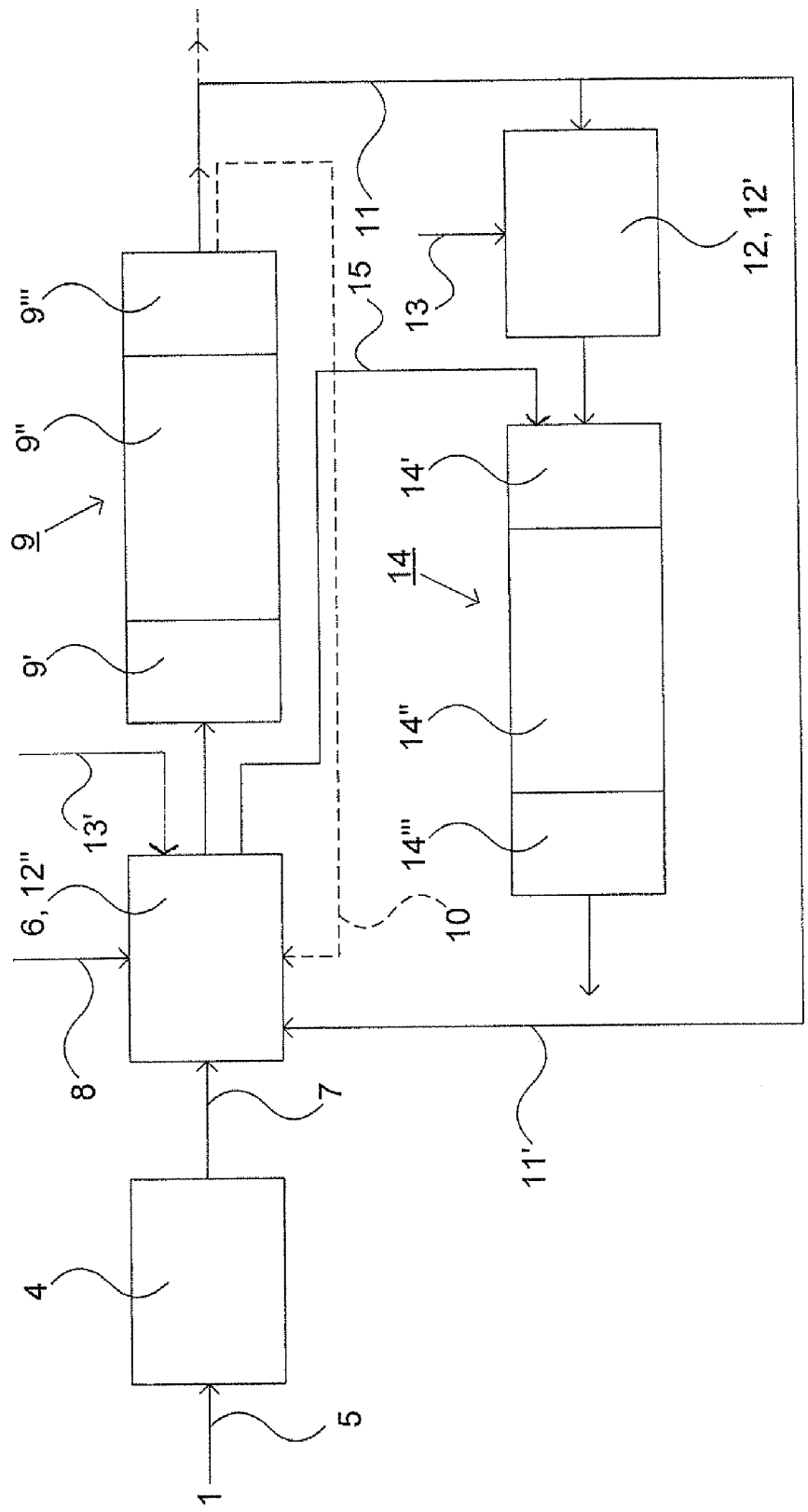
FIG. 2 is a schematic representation, in the form of a block diagram, of a first embodiment of a method according to the present invention.

According to the embodiment of FIG. 2 of the method according to the invention, washers 1, which have been previously hardened by heating to an austenitizing temperature and subsequent quenching, are, in some cases after certain tempering, supplied to a pre-treatment step 4 as indicated by the arrow 5. The pre-treatment may include washing and blasting and depends on the surface status of the hardened washers. In some cases it might be desirable to temper the hardened washers to a certain extent before coating, preferably to a quite limited extent such as to an extent decreasing the steel hardness by about 5-15%, preferably by less than about 10%. Many steels, such as low alloy boron steels are quite ductile as hardened and do not need any tempering for the present purpose.

After the pre-treatment a basic coating application step 6 follows, preferably in a centrifugal device 6, to which the washers 1 as well as coating in liquid form are transferred as indicated by arrows 7 and 8, respectively. In a curing step, generally designated by 9, the applied basic coating of the washers is cured, the liquid components of the basic coating being removed by heating. The curing step 9 may, according to a preferred embodiment, include a pre-heating step 9' and a main curing step 9" followed by a cooling step 9"'. After having passed the curing step 9 the washers are covered by a metallic basic coating. According to embodiments sometimes preferred, the washers having a first basic coating are recirculated to the basic coating application step 6, as indicated by the arrow 10, and further to the curing step 9 for application of another layer of basic coating.

Further, according to preferred embodiments, a post sealing top coat is applied over the basic coating of the washers, which are for this purpose transferred to a top coat application line as indicated by the arrow 11. According to preferred embodiments this line includes a top coat application step 12, preferably in the form of a centrifugal device 12', into which the washers as well as top coat in liquid form are transferred as indicated by the arrows 11 and 13, respectively. In a curing step, generally designated by 14, the applied top coat is cured, the liquid components of the top coat being removed by heating. Also this curing step may include a pre-heating step 14' and a main curing step 14" as well as a cooling step 14"'.

In an alternative embodiment sometimes preferred the top coating application step is performed in the same application step, preferably in the form of a centrifugal device, as the basic coating application step, preferably in the form of a centrifugal device.

This embodiment is indicated in FIG. 2 by means of the arrows 11' and 13' leading to the step 6, 12" for the washers and the top coat, respectively, the curing step 9 preferably also being used for curing the applied top coat according to this alternative embodiment the process parameters of the curing step 9, however, when applicable, being adapted for this alternative curing step. A separate curing step 14 for the top coat may however be imagined also in this embodiment, as indicated by the arrow 15.

The coating step/-s of the method according to the present invention is/are performed non-electrolytically and under conditions such that tempering of the hardened washers is prevented or substantially prevented.

Thus, typically, the curing step 9 for the basic coating comprises pre-heating for about 10 minutes at about 60-120° C., preferably about 80° C., and main curing for less than 60 minutes, preferably less than 20 minutes, such as for about 15 minutes, at about 200° C., preferably at about 190-230° C.

Further, typically, the curing step 14 for the top coat comprises pre-heating for about 10 minutes below 200° C. and main curing for less than about 20 minutes, preferably for about 10 minutes, at about 200° C., preferably at about 190-210° C.

The basic coating as cured comprises a metallic layer comprising zinc flakes, and, more specifically, a metallic layer comprising a mixture of zinc flakes and aluminium flakes, the basic coating providing anti-corrosion properties for the washers. Typically, the metallic layer comprises about 74% zinc and about 8% aluminium by weight.

The post sealing top coat provides a sealing for the basic coating and makes sure that corrosion of the washer steel does not occur via porosities in the basic coating. Preferred is a top coat comprising dilithiumoxide.

According to preferred embodiments the basic coating is of the kind available on the market under the name DELTA PROTEKT™ KL 100 and the top coat is of the kind available on the market under the name DELTA PROTEKT™ VH 300, preferably of the kind VH 302 GZ or VH 301 GZ.

According to a specific embodiment the DELTA PROTECT™ KL 100 basic coating comprises substantially about 74.27% zinc, 8.07% aluminium, 14.3% titaniumdioxide and 3.5% silicondioxide.

Further, according to a specific embodiment the DELTA PROTECT™ VH 300 (VH 302 GZ or VH 301 GZ) top coat comprises substantially about 61% silica amorphous, 30.3% dilithiumoxide, The rest not to be declared.

Typically, the basic coating layer has a thickness of about 6-20 μm, preferably about 10 μm, and the top coat layer a thickness of about 1-3 μm.

According to preferred embodiments the hardness of the washer steel as coated is over 500 HV, preferably about 500-560 HV.

As washer steels a large number of different steels may be chosen.

According to preferred embodiments low-alloy boron steels are used, these steels substantially comprising 0.25-0.30% carbon 0.20-0.35% silicon 1.00-1.30% manganese, 0.030% phosphorus, 0.010% sulphur, 0.20 to 0.60% chromium, and 0.0015 to 0.0050% boron, the balance iron and normal impurities.

According to other preferred embodiments the washer steel carbon content is higher than 0.3% by weight, preferably 0.3-0.5% by weight, an example being a low-alloy boron steel according to European standard 30 MnCr B5, substantially comprising 0.3-0.36% carbon, ≦0.4% silicon, 1.2 to 1.5% manganese, ≦0.035% phosphorus, ≦0.040% sulphur, 0.3 to 0.6% chromium, 0.0008 to 0.005% boron, the balance iron and normal impurities.

EXAMPLE 1

Washers of the type NL10 made from a boron steel of the type Boloc 04, having a composition as given for the preferred 0.25-0.30% carbon low-alloy boron steels above, were heated to austenitizing temperature and subsequently quenched in water this producing a hardness of 581 HV. Subsequent tempering, preferably on-line in a band furnace, in 30 minutes at 200° C. produced a hardness of 529 HV, e., a hardness drop of about 9%.

The washers thus treated were then given a DELTA two layer basic coating and a one layer top coat as described above, each layer being heated at 200° C. for about 15 minutes, the hardness being about 513 HV after the coating treatment.

The method and the washer according to the invention should to a sufficient extent have been made clear from the description given above.

Thus, washers hardened to the desired hardness are coated non-electrolytically, the coating procedure involving heating to a temperature such that tempering of the hardened washers is avoided or substantially avoided. In addition to the maintained hardness the method provides an improved productivity.

Above the invention has been described in association with preferred embodiments. Of course further embodiments as well as minor additions and amendments may be imagined without departing from the basic inventive idea.

Application of the basic coating and the top coat may be performed as described above, the washers, after having been dipped in the liquid coating/coat, being processed in a centrifugal device for removal of access liquid. Other methods than this so-called dip-spin may be used, such as dip-drain (removal by draining without centrifugal device) or spraying.

Heating for pre-heating and curing may be performed in a suitable furnace, such as a gas-fired or electrical furnace.

The method according to the invention is also applicable for a nut to be used together with a pair of washers, each one being provided with a pattern of teeth and a pattern of cams, as well as for a nut provided with a pattern of teeth to be used together with a washer according to the invention.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for manufacturing a hardened steel locking washer, including an anti-corrosion coating, said washer having a first side and a second side, and including a pattern of teeth on said first side of said washer and a pattern of cams on said second side of said washer, the method comprising the steps of providing a low-alloy steel washer, having a carbon content greater than 0.25% by weight, hardening said low-alloy steel washer by heating to an austenitizing temperature and subsequent quenching to convert said low-alloy steel washer into a hardened low-alloy steel washer, and applying a basic coating comprising zinc flakes non-electrolytically onto said hardened low-alloy steel washer to convert said hardened low-alloy steel washer into said hardened steel locking washer having a hardness over 500 HV.

2. A method according to claim 1, wherein the carbon content of said low-alloy steel washer is greater than 0.3% by weight.

3. A method according to claim 1, including tempering said hardened low-alloy steel washer to a predetermined degree.

4. A method according to claim 3, wherein said predetermined degree of tempering decreases the steel hardness by about 5 to 15%.

5. A method according to claim 4, wherein said predetermined degree of tempering decreases the steel hardness by less than about 10%.

6. A method according to claim 1, wherein said basic coating applied onto said hardened low-alloy steel washer comprises zinc, aluminum, titanium dioxide and silicon dioxide.

7. A method according to claim 6, wherein said basic coating comprises 74.27% of said zinc, 8.07% of said aluminum, 14.3% of said titanium dioxide, and 3.45% of said silicon dioxide.

8. A method according to claim 6, including primary curing of said applied basic coating at a first temperature of about 190 to 230° C. for a first period of time of less than 60 minutes.

9. A method according to claim 8, wherein said first period of time is less than 20 minutes.

10. A method according to claim 9, wherein said first period of time is less than 15 minutes.

11. A method according to claim 8, including pre-heating for a second period of time of about 5 to 10 minutes at a second temperature of about 60 to 120° C. prior to said primary curing step.

12. A method according to claim 11, wherein said second period of time is about 7 minutes and said second temperature is about 80° C.

13. A method according to claim 1, including applying a post sealing top coat non-electrolytically onto said applied basic coating.

14. A method according to claim 13, wherein said top coat comprises amorphous silica and dilithium oxide.

15. A method according to claim 14, including primary curing of said top coat at a first temperature of about 190 to 210° C.

16. A method according to claim 15, wherein said primary curing step is carried out for a first period of time of less than 20 minutes.

17. A method according to claim 16, wherein said primary curing step is carried out for a first period of time of less than 10 minutes.

18. A method according to claim 15, including pre-heating for a second period of time of about 10 minutes at a second temperature below 200° C. prior to said top coat primary curing step.

19. A method according to claim 14, wherein said top coat comprises 61% of said amorphous silica and 30.3% of said dilithium dioxide.

20. A method according to claim 1, wherein said coated washer has a hardness of about 500 to 560 HV.

21. A method according to claim 1, wherein said low alloy steel washer comprises
   0.25 to 0.30% carbon
   0.20 to 0.35% silicon
   1.00 to 1.30% manganese
   0.030% phosphorus
   0.010% sulphur
   0.20 to 0.60% chromium, and
   0.0015 to 0.0050% boron, with the balance comprising iron and normal impurities.

22. A method according to claim 1, wherein said low alloy steel washer comprises
   0.3 to 0.36% carbon
   up to 0.4% silicon
   1.2 to 1.5% manganese
   up to 0.035% phosphorus
   up to 0.040% sulphur
   0.3 to 0.6% chromium, and
   0.0008 to 0.005% boron, with the balance comprising iron and normal impurities.

* * * * *